United States Patent
O'Neill et al.

(10) Patent No.: US 8,011,242 B2
(45) Date of Patent: Sep. 6, 2011

(54) SYSTEM AND DEVICE FOR MEASURING AND ANALYZING FORCES APPLIED BY A CYCLIST ON A PEDAL OF A BICYCLE

(75) Inventors: George David O'Neill, Emeryville, CA (US); Clark Farrell Foy, Los Gatos, CA (US); Timothy S. Clark, Moss Beach, CA (US); Patrice Gagnon, Sainte Sophie (CA)

(73) Assignee: Garmin Switzerland GmbH (CH)

( * ) Notice: Subject to any disclaimer, the term of this patent is extended or adjusted under 35 U.S.C. 154(b) by 181 days.

(21) Appl. No.: 12/511,863

(22) Filed: Jul. 29, 2009

(65) Prior Publication Data

US 2010/0024590 A1    Feb. 4, 2010

Related U.S. Application Data

(60) Provisional application No. 61/084,603, filed on Jul. 29, 2008, provisional application No. 61/154,671, filed on Feb. 23, 2009.

(51) Int. Cl.
*A61B 5/22* (2006.01)
(52) U.S. Cl. ............................................ 73/379.01
(58) Field of Classification Search .......... 73/279.01, 73/579, 132, 379.01, 379.07; 702/41; 180/205
See application file for complete search history.

(56) References Cited

U.S. PATENT DOCUMENTS

| | | | |
|---|---|---|---|
| 667,920 A | 2/1901 | Perkins | |
| 4,141,248 A | 2/1979 | Bargenda | |
| 4,423,630 A | 1/1984 | Morrison | |
| 4,463,433 A * | 7/1984 | Hull et al. | 702/41 |
| 4,512,567 A | 4/1985 | Phillips | |
| 4,541,500 A * | 9/1985 | Gelhard | 180/205 |
| 4,811,612 A | 3/1989 | Mercat | |
| 4,966,380 A | 10/1990 | Mercat | |
| 5,027,303 A | 6/1991 | Witte | |
| 5,031,455 A | 7/1991 | Cline | |
| 5,050,865 A | 9/1991 | Augspurger et al. | |
| 5,065,633 A | 11/1991 | Mercat | |
| 5,202,627 A | 4/1993 | Sale | |
| 5,257,540 A | 11/1993 | Bower et al. | |
| 5,571,056 A * | 11/1996 | Gilbert | 474/80 |

(Continued)

FOREIGN PATENT DOCUMENTS

DE    29 48 774 A1    6/1980

(Continued)

OTHER PUBLICATIONS

International Search Report from corresponding International Application No. PCT/US2009/069900, dated Dec. 31, 2009.

(Continued)

*Primary Examiner* — Jewel Thompson
(74) *Attorney, Agent, or Firm* — Samuel M. Korte

(57) ABSTRACT

According to some embodiments, a sensor device for determining forces exerted by a cyclist on a pedal of a bicycle is provided. The sensor device includes a plurality of sensors coupled to a substrate, and wiring coupled to the sensors and the substrate, wherein the sensors, the substrate, and the wiring are housed inside a pedal spindle coupled to the pedal. The sensor device may also be used in a system for improving a pedaling technique of a cyclist.

28 Claims, 9 Drawing Sheets

U.S. PATENT DOCUMENTS

| | | | |
|---|---|---|---|
| 5,591,908 A | 1/1997 | Reid | |
| 5,785,336 A * | 7/1998 | Jang | 280/234 |
| 5,992,553 A | 11/1999 | Morrison | |
| 6,142,913 A | 11/2000 | Ewert | |
| 6,196,347 B1 * | 3/2001 | Chao et al. | 180/206 |
| 6,288,533 B1 | 9/2001 | Haeberli et al. | |
| 6,321,158 B1 | 11/2001 | DeLorme et al. | 701/201 |
| 6,360,606 B2 * | 3/2002 | Hirota et al. | 73/579 |
| 6,418,797 B1 | 7/2002 | Ambrosina et al. | |
| 6,498,994 B2 | 12/2002 | Vock et al. | |
| 6,539,336 B1 | 3/2003 | Vock et al. | |
| 6,856,934 B2 | 2/2005 | Vock et al. | |
| 7,092,846 B2 | 8/2006 | Vock et al. | |
| 7,134,327 B2 * | 11/2006 | Saito et al. | 73/132 |
| 7,162,392 B2 | 1/2007 | Vock et al. | |
| 7,226,395 B2 | 6/2007 | Wu et al. | |
| 7,833,135 B2 * | 11/2010 | Radow et al. | 482/57 |
| 2005/0107221 A1 | 5/2005 | Vohryzka | |
| 2006/0235642 A1 | 10/2006 | Vock et al. | |
| 2006/0246631 A1 | 11/2006 | Lutz et al. | |
| 2006/0248965 A1 | 11/2006 | Wyatt et al. | |
| 2007/0137307 A1 | 6/2007 | Gruben et al. | 73/774 |
| 2007/0170688 A1 | 7/2007 | Watson | |
| 2008/0053228 A1 | 3/2008 | Pan et al. | |
| 2010/0198453 A1 * | 8/2010 | Dorogusker et al. | 701/33 |

FOREIGN PATENT DOCUMENTS

| | | |
|---|---|---|
| DE | 37 22 728 C1 | 12/1988 |
| DE | 285 552 A5 | 12/1990 |
| DE | 294 673 A5 | 10/1991 |
| DE | 94 15 162.8 | 11/1994 |
| DE | 295 07 357 U 1 | 7/1995 |
| DE | 44 35 174 C2 | 3/1996 |
| DE | 296 11 344 U 1 | 10/1996 |
| DE | 29611344 | 10/1996 |
| DE | 298 10 641 U 1 | 9/1998 |
| DE | 29810641 | 9/1998 |
| DE | 199 11 138 A1 | 10/2000 |
| DE | 103 41 890 A1 | 4/2005 |
| DE | 20 2005 010 822 U1 | 11/2005 |
| DE | 10 2006 020 695 A1 | 11/2007 |
| DE | 20 2006 019 191 U1 | 5/2008 |
| DE | 202006019191 | 5/2008 |
| GB | 2 037 444 A | 7/1980 |
| JP | 10 165556 | 6/1998 |
| WO | WO 03/045508 A2 | 6/2003 |
| WO | WO 2004/113157 A1 | 12/2004 |
| WO | WO 2007/048431 A2 | 5/2007 |

OTHER PUBLICATIONS

Broker J. P. et al., "A Dual Piezoelectric Element Force Pedal for Kinetic Analysis of Cycling," *International Journal of Sport Biomechanics*, 6:394-403 (1990).

Cruz C.F. et al., "Electromyography in Cycling: Difference Between Clipless Pedal and Toe Clip Pedal," *Electromyography and Clinical Neurophysiology*, 41(4):247-252 (2001).

Eisner W. D. et al., "Electromyographic Timing Analysis of Forward and Backward Cycling," *Medicine and Science in Sports and Exercise*, 31(3):449-455 (1999).

Iwashita A. et al., "Electromyograhic Analysis of the Lower Extremities During Ergometric Cycling," *Journal of Japanese Physical Therapy Association*, 31(2):135-142 (2004).

Miller M.S. et al., Electromyographic Analysis of a Human Powered Stepper Bike, Department of Mechanical Engineering, University of Vermont, 2 pages.

Pasini M. et al., "A Biomechanical Model of the Cervical Spine During Cycling," University of Vale do Rios dos Sinos, XXV ISBS Symposium 2007, Ouro Preto—Brasil, pp. 402-405.

Rambarran K. K. et al. "Variability of Muscle Activity During Off-Road Cycling," School of Human Kinetics, University of Ottawa, 3 pages.

Reiser R.F. et al., "Instrumented Bicycle Pedals for Dynamic Measurement of Propulsive Cycling Loads," *Sports Engineering*, 6:41-48 (2003).

Wheeler J. B. et al., "A Dual Piezoelectric Bicycle Pedal With Multiple Shoe/Pedal Interface Compatibility," *International Journal of Sport Biomechanics*, 8:251-258 (1992).

International Search Report and Written Opinion mailed Oct. 29, 2009, in related International Application No. PCT/US2009/004410.

* cited by examiner

SYSTEM AND DEVICE FOR MEASURING AND ANALYZING FORCES APPLIED BY A CYCLIST ON A PEDAL OF A BICYCLE

RELATED APPLICATIONS

This application claims priority to U.S. Provisional Application No. 61/084,603, filed on Jul. 29, 2008, and U.S. Provisional Application No. 61/154,671 filed on Feb. 23, 2009. The contents of these applications are hereby incorporated by reference in their entirety.

TECHNICAL FIELD

The present disclosure is related to a device for measuring and analyzing forces applied by a cyclist on a pedal. The device may be used in a system for presenting the analysis of the applied forces to the cyclist or a coach to assist in training and maximizing performance.

BACKGROUND

A cyclist achieves optimal pedaling efficiency when there is little to no wasted force exerted on a pedal. This occurs when force is exerted on the pedal in a direction tangential to the arc of pedal travel in the direction of rotation of the cycle's crank. Forces exerted by the cyclist in any other direction are considered wasted forces, which reduce the cyclist's efficiency. By actively analyzing their pedaling strokes, cyclists may be able to correct their motion to minimize the amount of wasted forces produced, and thus increase their efficiency and endurance.

Previous devices and systems have been developed to analyze forces applied by a cyclist on a pedal. Such previous devices and systems have used strain gauges or piezoresistors mounted on a pedal, on other parts of a cycle, or on the shoes or cleats of the cyclist. The previous devices and systems, however, have required extensive calibration and complicated equipment, and therefore have been limited to use in the laboratory.

One such system is described in Reiser II, et al., "Instrumented bicycle pedals for dynamic measurement of propulsive cycling loads," Sports Engineering, 2003, vol. 6, pp. 41-48 ("the Reiser system"). The sensor arrangement of the Reiser system is illustrated in FIG. 1. As shown in FIG. 1, the sensor arrangement includes eight strain gauges $102_1$-$102_8$ affixed to an outer surface of a pedal spindle 104, which is coupled to a crank arm 106 of a bicycle. In operation, the eight strain gauges $102_1$-$102_8$ are wired to form two complete Wheatstone bridge arrangements such that each bridge measures an applied force component either normal or tangential to the surface of the pedal. This configuration allows the force to be measured independently of the location due to the fact that the applied force is proportional to a difference in a measured deformation, or strain, at each row of strain gauges $102_1$-$102_8$. Thus, a moment $M_i$ at a first bridge of gauges $102_1$-$102_4$ or a second bridge of gauges $102_5$-$102_8$ due to an applied force F, at a distance x from the second bridge of gauges $102_5$-$102_8$ is equal to $M_i$=F·x, and the moment at a distance x+L from the first bridge of gauges $102_1$-$102_4$ is equal to $M_m$=F·(x+L). Using these equations for the moments, the force F can be given as $$F = \frac{M_m - M_i}{L}.$$

The moments at the first bridge of gauges $102_1$-$102_4$ and at the second bridge of gauges $102_5$-$102_8$ are related to the surface strains $\epsilon_m$ and $\epsilon_i$, respectively, measured by the bridges, and respectively given by:

$$\frac{M_m = \varepsilon_m \cdot I \cdot E}{c} \text{ and } \frac{M_i = \varepsilon_i \cdot I \cdot E}{c},$$

wherein I is the moment of inertia, E is the Young's Modulus, and c is a maximum distance from a neutral surface. Using the above equations, the force F can be determined from the surface strains measured by each of the bridges, while being independent of the location of the applied force such that $$F = \frac{I \cdot E}{c} \cdot \left(\frac{\varepsilon_m - \varepsilon_i}{L}\right).$$

Accordingly, the Reiser system provides a compact pedal-spindle-mounted sensor system that allows for the measurement of forces applied by a cyclist on a pedal. The data obtained by strain gauges $102_1$-$102_8$ is transmitted through a cable connected to the pedal spindle to an external computer for the determination of the applied forces.

But, the Reiser system requires the use of a modified pedal, the enlargement of the threaded pedal spindle hole of the crank, and a specially machined pedal spindle having the sensors attached thereto. The Reiser system is also only accurate using specially designed pedal spindles which, unlike standard commercially-available pedal spindles, are designed and built to have a linear response to applied forces. Moreover, the Reiser system also requires complex external electronics, including a portable computer, in order to provide data, thus making the system impractical for immediate analysis by a cyclist while riding.

In addition, there have been other systems and devices which have been designed to measure forces applied by a cyclist on a pedal, including modified pedals having sensors built into the pedals, and sensors to be placed on or in a cyclist's shoe or cleat. The prior art pedals, however, often require extensive external electronics for processing, making them unsuitable for use outside of a laboratory. In addition, those systems and devices that have been designed for portability often require specialized equipment, are susceptible to damage from external environmental factors, or produce results which are very noisy, and thus are unable to provide accurate, useful results to the cyclist.

BRIEF SUMMARY

According to some embodiments, a sensor device for determining forces exerted by a cyclist on a pedal of a bicycle is provided. The sensor device includes a plurality of sensors coupled to a substrate, and wiring coupled to the sensors and the substrate, wherein the sensors, the substrate, and the wiring are housed inside a pedal spindle coupled to the pedal.

In accordance with some embodiments, a system for improving a pedaling technique of a cyclist is also provided. The system includes a sensor provided in a pedal spindle of a pedal, the sensor determining forces exerted by the cyclist on the pedal, a storage medium and a processor coupled to the sensor, the processor executing instructions stored in the storage medium for analyzing the determined forces to provide information related to the pedaling of the cyclist, a display coupled to the sensor, the display providing the information in real time to the cyclist.

According to further embodiments, a bicycling device is also provided. The bicycling device includes a pedal, a pedal spindle coupled to the pedal, a sensor provided in the pedal spindle, the sensor determining forces exerted by the cyclist on the pedal, a storage medium and a processor coupled to the sensor, the processor executing instructions stored in the storage medium for analyzing the determined forces to provide information related to the pedaling of the cyclist, a display coupled to the sensor, the display providing the information in real time to the cyclist.

Additional advantages of the disclosed embodiments will be set forth in part in the description which follows, and in part will be obvious from the description, or may be learned by practice of the disclosed embodiments.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate disclosed embodiments and together with the description, serve to explain the principles of the disclosed embodiments.

DETAILED DESCRIPTION OF THE DISCLOSED EMBODIMENTS

Reference will now be made in detail to the disclosed embodiments which are illustrated in the accompanying drawings. Wherever possible, the same reference numbers will be used throughout the drawings to refer to the same or like parts.

Embodiments disclosed herein are related to devices and systems which may be used to measure properties of cyclists as they pedal their bicycles. Such properties include the applied and wasted forces or power applied by a cyclist on a pedal, the cyclist's cadence, the cyclist's heart rate, the cyclist's pedaling efficiency, and the speed, inclination, slope, and grade of the bicycle. In particular, embodiments disclosed herein are related to a sensor or device that is able to measure these properties. The sensor or device may be affixed or mounted on a part of the cyclist, such as the cyclist's shoe, or may be mounted on or in the pedal. According to some embodiments, the sensor or device may be mounted in the pedal spindle. A pedal spindle device according to some embodiments may use strain gauges, which may be affixed to a spring substrate, or the pedal spindle device may use piezoelectric elements or piezoresistors or other electronic or optical sensors that allow the measurement of deflection or force, mounted inside a pedal spindle to determine the force applied to a cycle crank arm by a cyclist. In accordance with some embodiments, the pedal spindle device measures and resolves the force into a vector that powers the cycle and a waste vector that does not contribute to the driving of the cycle.

Figure 1:
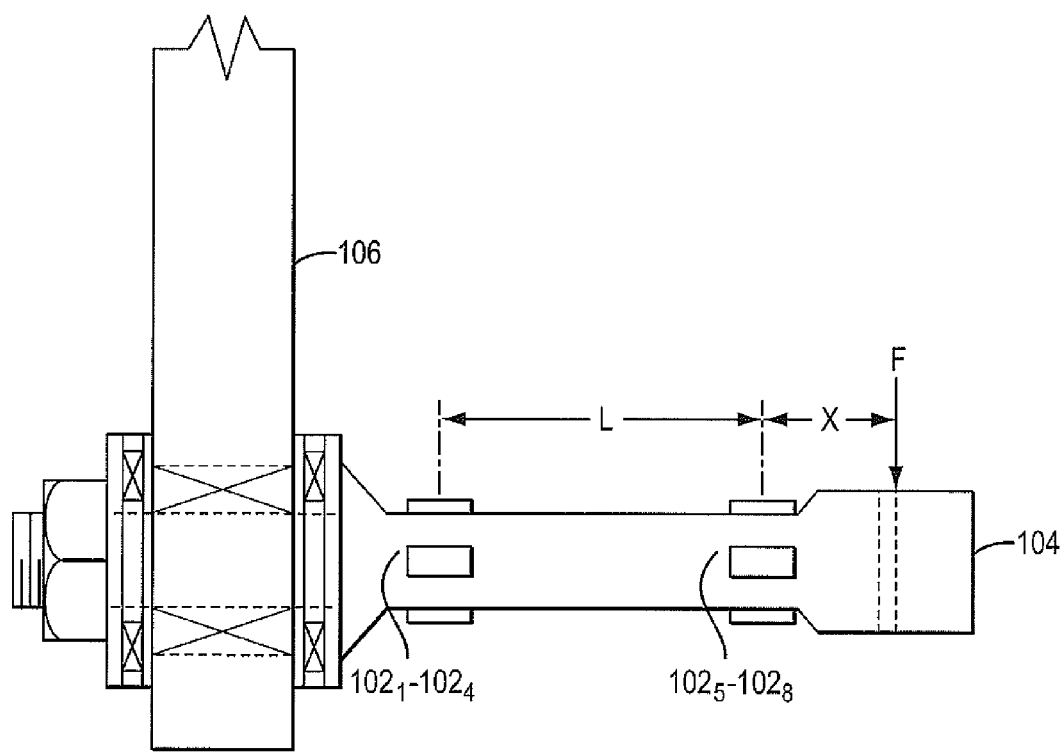
FIG. 1 is a diagram illustrating a sensor device according to the prior art.

According to some embodiments, the pedal spindle device may determine the distance from the end of the pedal spindle at the crank arm to the center of force applied by a cyclist so that the effective moment of the applied force may be determined. In some embodiments, a pedal spindle device can use two sets of strain gauges or other sensors to measure the deflection or other mechanical deformation of the pedal spindle through two planes, as outlined in the Reiser system, and shown in FIG. 1.

In accordance with some embodiments, the pedal spindle device may further alter the electrical configuration of the components while in use. For example, each axis may have a full Wheatstone bridge of strain gauges dedicated to measuring deflection, where the full bridge may be separated into two half bridges intermittently to determine the location along that axis of the center of force. The full bridge configuration has the advantages of greater sensitivity and full temperature compensation, and the half bridges have the advantage of being in different planes across the axis of deformation thus responding differently to the applied force because of the different locations of the measurement planes. The location of the center of the applied force may be located by comparing the difference of the output of the two half bridges, with temperature compensation provided as required by a thermistor or other means. This method has further advantages in saving expenses due to reduced component cost and reduced space requirements.

In accordance with some embodiments, the pedal spindle device can allow the tracking of the center of force applied by a cyclist through time, so that pronation, supination, inversion, and eversion of the foot of the cyclist may be observed. This information may be used to assist in altering the cycle, shoes, orthotic devices, cleats, or position or other parameters of a cyclist/cycle system to enhance pedaling efficiency.

Analysis of vectors measured by the pedal spindle device enables analysis of pedaling technique. Analyses may be used to determine sizes and types of orthotics to correct for pronation or supination by the cyclist. Left and right sides may be observed and treated independently. Analyses may also be used to determine how much float the cyclist utilizes while pedaling, and where on the pedaling cycle this float is used. Adjustments to equipment used by the cyclist may then be tried and subsequent observations may reveal increases in pedaling efficiency and/or reduced tendency to float and thus reduce potential injuries or prevent the exacerbation of existing injuries. Comparison of pedaling technique difference between left and right sides of a cyclist may reveal a difference in leg length, which may result in different values observed on the waste component of the pedaling force vector at bottom dead center. Imbalances may then be corrected as suitable, for example, by fitting a shim under the cyclist's shoe on the shorter leg, by fitting an orthotic insert under the shorter leg, or by moving a cleat under one foot or the other in the suitable direction. Thus, pedal spindle devices allow quantified optimization by enabling comparisons of technique and efficiency before and after changes under similar conditions of cadence and power input (energy imparted to the system by the cyclist) or output (energy available to drive the cycle). Pedaling cycles may become more even and balanced, resulting in less wasted effort by the cyclist since the cyclist will not have to reaccelerate the cycle as much on each pedaling stroke.

In accordance with some embodiments, a pedal spindle device may enable analysis of the forces applied by the pedal to the cyclist's leg at the bottom of the pedaling circle. Some patterns in such forces may indicate or suggest that the cyclist may benefit from a change in seat height. For example, if the forces applied by the pedal to stop the downward motion of the leg are consistent with the cadence of pedaling, the seat height is likely optimal. If the force decreases as cadence increases, the cyclist is likely overextending on the downstroke and rocking in the saddle, indicating that a lowering of the saddle may help achieve greater and smoother power. More upforce from the pedal to the leg may indicate that the saddle is low; such patterns may also be accompanied by the better control and increased force in the backward direction as the cyclist pulls the leg aft. While such force drives the cycle and smoothes the application of power to the rear wheel in a way that is advantageous for loose or wet surfaces (as seen off-road in mountain biking events, for example), a cyclist wishing to maximize driving power might benefit from lifting the saddle. In accordance with some embodiments, a pedal spindle device may allow comparison of such changes, enabling the cyclist, fitter, and coach to optimize as desired.

According to some embodiments, a pedal spindle device as disclosed herein may allow for the determination of an angular position of a cyclist's peak exerted force. The angular position of the peak force exerted by the cyclist, relative to the peak force in the waste direction (parallel to the crank) at bottom dead center (BDC) may indicate that the cyclist's seat is in a suboptimal position. The peak force at bottom dead center will occur when the crank is vertically oriented downward since the force is caused by the pedal supporting the leg against gravity as the leg stops traveling down and reverses vertical direction on its way up again. The desired angle of the peak power is 90 degrees ahead of this event. An early peak suggests that the saddle is too far aft for the cyclist, since the knee is applying maximum force, as it is perpendicular to the crank circle, before the crank is horizontal. Similarly, a saddle forward off of optimal will cause a late peak in the pedaling force. Other designs of cycles (such as "crank forward" designs or recumbents) will have differing relationships between optimal force generating angular positions and bottom dead center gravity induced peak forces in the waste direction, which the pedal spindle device can be used to also measure.

In some embodiments, the pedal spindle device can enable the discovery and tracking of physiological problems by enabling the observation of left and right leg forces individually. The observation and quantification of such problems allows optimization of cycling ability with respect to those problems. For example, a change in saddle position leading to a decrease in power in one leg may indicate a blood flow problem to the leg, because moving the saddle aft on its rails closes the angle between the thigh and hips. The saddle may be moved back towards the original position by increments until both legs show similar fatigue profiles again. Thus, an optimal position may be found while maintaining blood flow to the legs and maximizing power output. The pedal spindle device can enable dynamic fitting of a cyclist to a cycle rather than the current practice of static fitting in a fixed setting, such as a laboratory or bicycle shop.

In some embodiments, the pedal spindle device may be used by a cyclist to determine optimal cadence dynamically by observing efficiency. As efficiency (circularity of pedaling, or percentage of force applied by the cyclist that is directed in the power direction) changes, the cyclist may be able to return to a higher efficiency by increasing or reducing cadence. The cyclist can maximize the force delivered to the cranks such that the force will power the cycle, while minimizing the cyclist's effort. A cyclist may observe his or her heart rate while watching pedaling efficiency and power output and choose the cadence that gives the desired power while minimizing waste and or heart rate.

In some embodiments, a sensor may be built into the pedal or the shoes or cleat of a cyclist. Advantages of such embodiments include measuring the force applied to the pedal directly so that no mathematical adjustments are required for sensor response due to physical characteristics such as stiffness of the pedal spindle or bearing placement. An embodiment of the sensor structured to work on a pedal platform may measure forces applied by the cleat to the platform or by the platform applied to its bearings. Advantages of measurement at the platform-bearing interface include protection from environmental damage. In embodiments, such sensors may be calibrated during manufacture for magnitude of force applied by the cyclist. Moreover, further calibration at the time of installation or use may be done to determine the angular relationship between the crank and the applied force vector. A magnet in the pedal spindle may be used to determine the relationship between the applied vector and the desired direction of application, which is tangential to the arc of rotation of the crank. Setting the shoe and/or pedal platform and the crank horizontal while recording the measured angle may enable the device in use to compare the sensed angle to the recorded calibration angle. This observed angle may then be used to determine the direction of drive force and waste vectors. Calibration of these embodiments may also be performed by software, wherein calibration parameters may be determined by software analysis of a sample of pedaling performed by the cyclist. In such embodiments, algorithms may be used that learn as the sample of data increases. Analysis of such data stream may not require a manual calibration routine. Moreover, GPS displacement may calculate work, which may allow deriving a driving force vector using the known mass of the cyclist. Work may also be determined from a measured distance (e.g., measured by wheel rotations), incline (e.g., measured by a set of accelerometers in the recording device or by changes in sensed barometric pressure), and/or other factors (e.g., wind forces).

According to some embodiments, another sensor for detecting the angle of the pedal platform relative to the crank may be included so that the power and waste components of the applied force can be resolved. This angle detection sensor may detect the angle of the pedal platform relative to a crank arm or pedal spindle by means of a magnet and magnetic field detector or an optical encoder or by other means. A magnet, such as a ring magnet, may be attached to the pedal platform about the spindle axis and the position/orientation of the magnet detected electronically so that the angle of the magnet, and thus the platform, can be determined. Alternatively, the magnet may be attached to the spindle and the sensor may be mounted in the pedal platform for embodiments of the pedal spindle device in the pedal platform rather than the pedal spindle. In another embodiment, the magnet may be attached to a chain stay of the cycle, and a magnetic field detector may be placed in the pedal spindle, in the pedal, or on the cyclist's shoe, allowing for the detection of the magnet upon each rotation of the crank. The measurement and reporting and/or recording of pedal platform angle enables determination of muscle firing timing, as described in academic literature, and enables determination of physical characteristics of the cyclist which may be used for fitting of the bicycle to the cyclist. For example, the data recorded while cycling may show that each leg has a different platform angle at similar crank angles during the pedaling cycle, which may be caused by incorrect cleat positioning on the shoe or different leg lengths of the cyclist. The sensing or recording of platform angle may also be utilized for determining cadence and to replace or augment other methods of crank angle detection. Software may allow the cyclist to place marks in a dataset by "gesturing" with the pedal platforms to add marks of interest to the file. For example, a cyclist might pedal one circle with a shoe pointed downward from the normal position, which could be recognized by software as indicating a point of interest to a cyclist such as the beginning of a hill the beginning of a lap of a favorite training route.

Embodiments built into the pedal platform may be powered by solar cells mounted to the underside of the pedal platform. Pedal platforms that permit cleats to attach to either side ("dual-sided entry" designs) may have a panel on each side so that one side is always uncovered in use. Electrical power running to the pedal spindle device may be transferred to the pedal spindle device from the cyclist's shoe through the cleat or through contacts which contact the pedal platform nearer the center of the pedal platform away from the cleat engagement area. Thus, the pedal spindle device may be powered by batteries in the cyclist shoe or power may be provided by solar panels carried on the cyclist's shoe. The pedal spindle device may be powered by harvesting power from piezoelectric elements within the cyclist's shoes or cleats.

In accordance with some embodiments, a sensor device may be affixed to a bicycle crank. A sensor device attached to the bicycle crank may be calibrated by first aligning the device in a known direction, for instance pointing down, and then using accelerometers within the sensor device to perform a calibration by recording the alignment of the axes of force measurement relative to the known position direction. Such determination of force axes alignment to the outside frame of reference (i.e., the crank) may be performed automatically by the sensor device by recording data over a series of revolutions of the crank with the cyclist pedaling and then assigning the waste force vector peaks as down, since the waste force will be at a maximum when the centripetal acceleration and the acceleration due to gravity both act on the cyclist's leg simultaneously in the down direction.

According to some embodiments, user programmable software may be executed by a processor coupled to the sensor device, that may determine optimal shift points for the cyclist and then indicate the need to shift for optimal performance, or provide a signal to an external device which can shift the gear for the cyclist automatically. Shifts may be indicated or executed in response to fatigue detection by the device, in response to cadence falling outside a preset range, a preset desired power output, or in response to other parameters.

The systems and methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Figure 2:
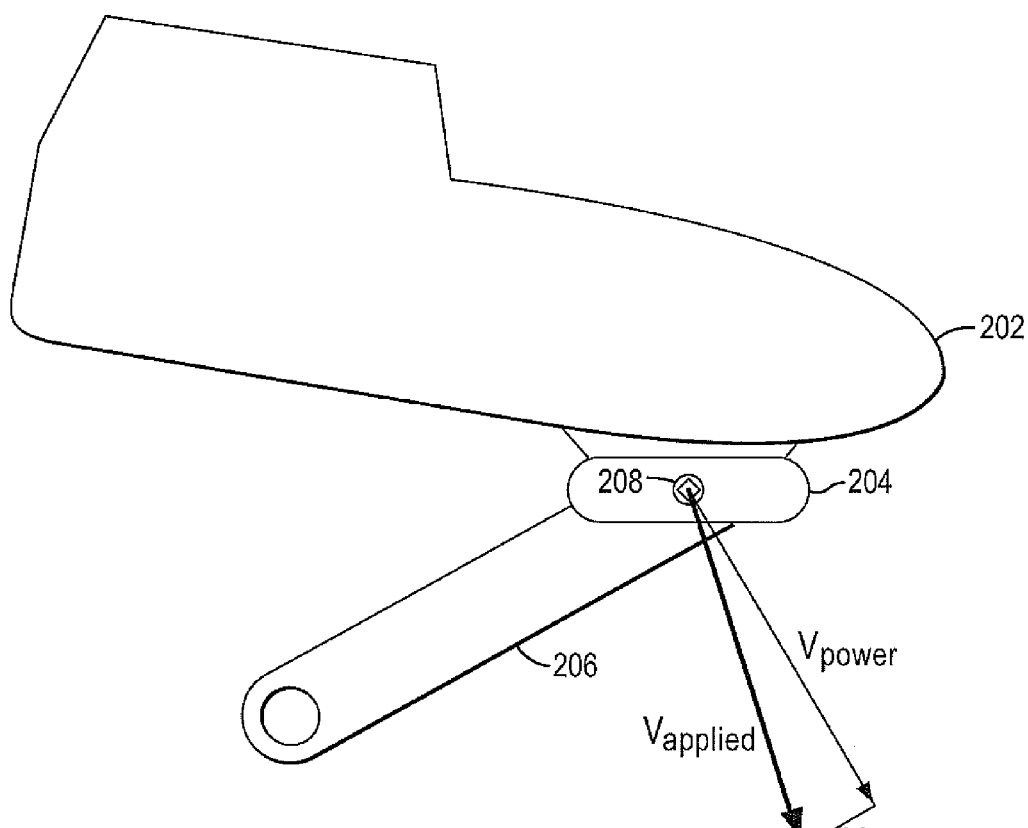
FIG. 2 is a diagram illustrating forces applied by a cyclist, consistent with some embodiments.

FIG. 2 is a diagram illustrating forces applied by a cyclist, consistent with some embodiments. As shown in FIG. 2, a cyclist 202 applies a force $V_{applied}$ to a pedal 204 coupled to a crank 206. Applied force $V_{applied}$ can be separated into two orthogonal components by a device or sensor mounted on the cycle or cyclist 202. According to some embodiments, a device or sensor consistent with embodiments disclosed herein may be mounted in the pedal spindle 208, may be mounted on or in a shoe of cyclist 202, or may be mounted on pedal 204. The two orthogonal components are crank propulsion force $V_{power}$, which drives crank 206 and is at a ninety degree (90°) angle to an imaginary line between a center of pedal spindle 208 and an axis of crank 206. The second component is the wasted force $V_{waste}$, which may be at a ninety degree (90°) angle to crank propulsion force $V_{power}$ and in the plane of the pedaling circle. In order to maximize efficiency, a cyclist ideally wants to improve their pedaling such that wasted force $V_{waste}$ is minimized, resulting in crank propulsion force $V_{power}$ becoming closer to, and eventually becoming equal to, applied force $V_{applied}$.

Figure 3:
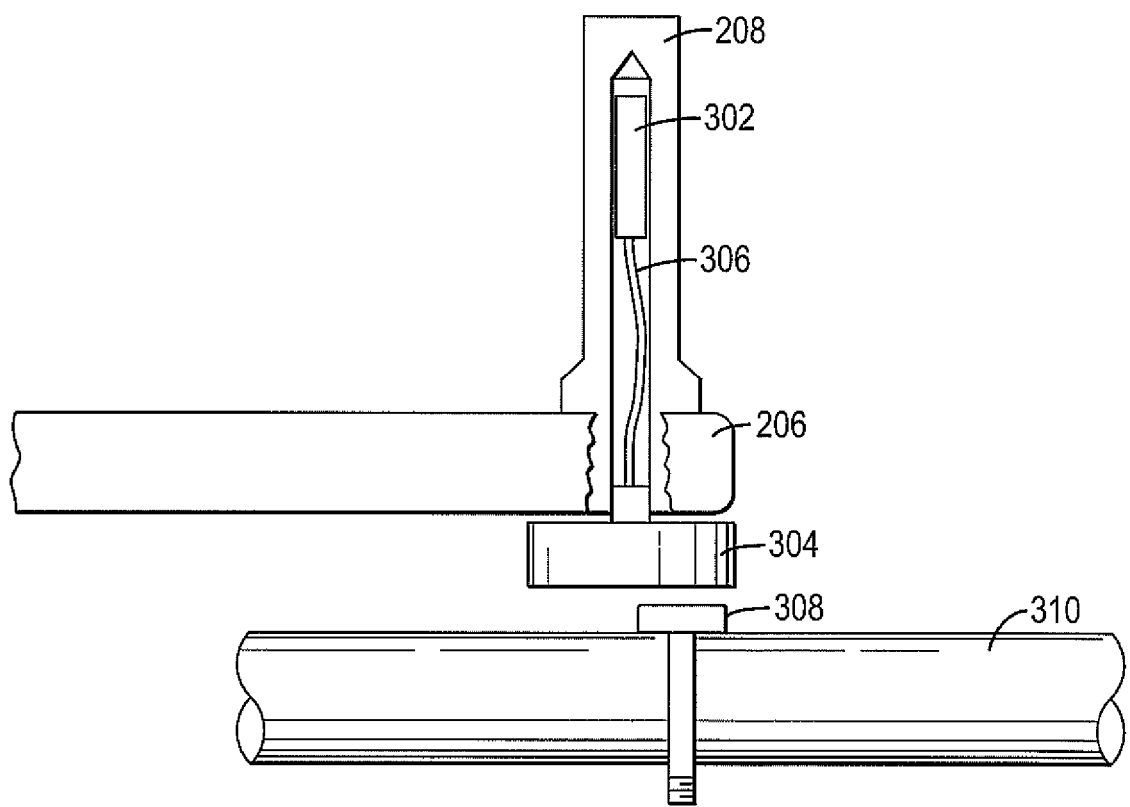
FIG. 3 illustrates a device or system for measuring the applied forces applied by a cyclist, according to some embodiments.

FIG. 3 illustrates a sensor device for measuring the applied forces applied by a cyclist, according to some embodiments. As shown in FIG. 3, a sensor device 302 is mounted in pedal spindle 208. Consistent with some embodiments, sensor device 302 may be coupled to a resilient member, such as a spring, and encapsulated within said pedal using epoxy or resin so that spring will reliably bend with any forces applied to pedal 204 by a cyclist. However, in some embodiments, sensor device 302 may simply be mounted inside pedal spindle 208 using adhesive. As shown in FIG. 3, pedal spindle 208 may be mounted to crank arm 206 using known methods and configurations.

Consistent with some embodiments, sensor device 302 may be electrically coupled to an electronics module 304 via wiring 306. Consistent with some embodiments, electronics module 304 is a pedal module such that all components mounted in electronics module are mounted in pedal 204, and consistent with some embodiments electronics module 304 may be a crank module mounted to a crank, such as crank arm 206. Consistent with other embodiments, electronics module 304 may be miniaturized and mounted inside pedal spindle 208 along with sensor device 302.

As also shown in FIG. 3, a magnet 308 is mounted to a chain stay 310 of a bicycle frame. According to some embodiments, magnet 308 may cause a reed switch within electronics module 304 to close once per pedal crank revolution allowing for definite location of crank arm 206 once per revolution and calculation of pedaling cadence. According to some embodiments, an induction coil may be used instead of a reed switch. In operation, the passing of the magnet 308 over the induction coil will generate a current in the induction coil to indicate the passing of crank arm 206. Moreover, the generated current may also be used to charge a capacitor or power cell to power sensor device 302.

Sensor device 302 may include a sensor for measuring forces applied by cyclist 202. The sensor may include a strain gauge, a singing strain gauge, piezoelectrics or piezoresistors, laser interferometers, or other light-measuring devices. In addition, the sensor may measure the applied forces by measuring a vibratory frequency in pedal 204 or pedal spindle 208.

Consistent with some embodiments, sensor device 302 may be powered by a dry cell battery and/or rechargeable dry cell battery. The power from said dry cells or batteries may be transferred to the interior of pedal spindle 208 and sensor device 302 by induction or slip rings or other suitable means. In accordance with some embodiments, power may also be provided by solar cells affixed to pedal 204, crank 206, or a shoe or cleat of cyclist 202. According to some embodiments, power for sensor device 302 may be generated from piezoelectric devices which may be independent of, or part of, the force measuring sensors. Moreover, power may be provided by any combination of batteries, solar cells, piezoelectric devices, and induction.

In accordance with some embodiments, pedal spindle 208, which can accept the sensor device 302, may be prepared for the insertion and potting of sensor device 302 by solvent and subsequent bead blasting while inverted on an assembly line. Pedal spindle 208 may then be preheated by infrared heating lamps or hot air for instance. Pedal spindle 208 may then be inverted so that the opening of the bore faces upward. Sensor device 302 may then be dropped into the bore and the bore then filled with resin or epoxy or other suitable potting or encapsulating compound. The heated pedal spindle 208 will reduce the viscosity of the epoxy allowing the epoxy to thoroughly flow around all the internal components and to completely fill the bore and adhere to the cleaned wall of the bore. Maintaining the temperature while curing will allow pedal spindle 208 to cool after the epoxy has cured so that pedal spindle 208 will tighten around sensor device 302 and the epoxy plug.

Consistent with some embodiments, sensor device 302 may be self-calibrated. Consistent with other embodiments, however, sensor device 302 can be calibrated at the time of installation, or periodically to ensure proper operation. Calibration may be performed by applying known masses to a surface of pedal 204 while pedal 204 is rotated, and sensor device 302 outputs are recorded. This procedure may be repeated with different masses, and with masses suspended at different distances from crank 206 along a surface of pedal 204. Sensor device 302 outputs may then be stored in a storage device coupled to sensor device 302, such as in a lookup table, or may be used in determining or suitable calibration equations. Consistent with some embodiments, collection of data at different distances from crank 206 allows for determination of the center of force applied by cyclist 202, which in turn allows determination of supination or pronation of the cyclist's foot. This information may be used to provide a corrected reading for the measured magnitude of the applied force, since sensor device 302 may respond differently to a similar force applied to a different spot on a surface of pedal 204. In accordance with some embodiments, a processor may use data obtained during calibration to adjust for misalignment during installation, using a lookup table as described above, or using software to determine where on the pedaling cycle the cyclist is at a given moment. The place on the pedaling cycle may be determined by using a cadence sensor affixed to a chain stay, or a magnet mounted on a chain stay which is detected by a magnetic field sensor in or on pedal 204, or on sensor device 302.

Moreover, using generated look-up tables, as described above, and interpolation, a processor may execute software or instructions which can determine the applied forces applied on pedal 204 from a deformation measured by sensor device 302 for pedal spindles 208 which have a non-linear response to the applied forces. That is, using look-up tables and interpolation, a sensor device 302 consistent with some embodiments may be used to measure the applied forces on a pedal 204 having a stock, commercially-available pedal spindle.

In accordance with some embodiments, alignment marks may be provided on sensor device 302 to facilitate properly aligning sensor device 302 with the desired axes of measurement on the cycle when installing sensor device 302 in pedal spindle 208. Once sensor device 302 is installed, pedal spindle 208 may be installed on crank 206, and then secured in the proper alignment using fastening means, such as jam nuts. According to other embodiments, a resilient member, such as a spring, may be mounted between bearings on sensor device 302 and allow for the rotation of sensor device 302 between the bearings and then locking sensor device 302 in place, once properly aligned. In accordance with some embodiments, sensor device 302 may include setscrews acting against resilient members, such as springs, that apply an adjustable preloading force to one end of the resilient member while the other end remains fixed. The setscrews may then be tightened to fix sensor device 302 in a proper alignment.

In accordance with some embodiments, a magnetometer may be affixed to a surface of pedal 204. In other embodiments, a magnetometer may be mounted on sensor device 302. The magnetometer may be used to determine the angle of pedal 204 platform relative to the surface of the Earth. The accuracy of data collected from magnetometers may be enhanced for accuracy by utilizing geographic coordinates to adjust for dip angle of the Earth's magnetic field. Such information may be obtained from global positioning system (GPS) components or devices, or by performing a calibration, in the geographical region of use, prior to using the magnetometer. Such a magnetometer could then also serve as an inclinometer in use by comparing the maximum and minimum angles measured with those obtained in the immediate near past. The angle of pedal 204 relative to crank 206 may be determined by comparing the angle of pedal 204, as measured by the magnetometer, to the angle of crank 206 as determined by time and a sensor for determining a cadence, as described above.

In some embodiments, the pedal spindle device may measure an angle of pedal 204 relative to an angle of pedal spindle 208, and then utilize this information to determine cadence. Further, the comparison of this angle at certain places in the pedaling cycle, such as at bottom dead center, will allow the detection of asymmetries, such as differing leg lengths, or allow the detection of misplaced shoe cleats. Moreover, software may be used to determine an angle of pedal spindle 208 relative to an angle of crank 206 by tracking waste pulses, which will have greatest magnitude when the cyclists foot passes through BDC on the pedaling circle and will always be greatest at this point on the circle because the gravitational vector and the centripetal acceleration vector reinforce each other at this point. Detection of the passing of pedal 204 through a certain angle may give results as repeatable as a standard magnetic cadence sensor without requiring an external reference, which adds weight, may become separated from the cycle or misaligned, or deteriorate over time. When transferring a device according to some embodiments from cycle to cycle, only the device would need to be moved and no external magnets or wires require transfer.

Consistent with some embodiments, a sensor device 302 may include one or more accelerometers. Accelerometers may be used to measure accelerations of sensor device 302 in the x, y, and z axes, such that the accelerations experienced by the device can be used to determine how smoothly or uniformly the cyclist is pedaling. Uniform, acceleration-free pedaling is desirable because it results in less force and energy going to accelerate the cycle during each crank revolution. Moreover, the accelerometers may be capable of reporting all accelerations experienced by the device, such as acceleration due to gravity, centripetal acceleration due to the circular motion of the crank, and acceleration along the pedaling circle, introduced by the cyclist. As the cyclist cycles, the next acceleration vector measurement may be predicted using algorithms stored in a storage device in sensor device 302 or electronics module 304 executed by a processor, or by an external processor coupled to sensor device 302, using the most recent readings from sensor device 302 and an expected cadence derived from the waste peaks, or as reported over a bicycle area network such as provided by ANT enabled devices. The patterns of variance from the expected values may be reported to the cyclist by various software means to allow the cyclist to modify their technique to become smoother and more efficient. Such an algorithm may be adjusted for use with non-circular chainrings (e.g. Q-Rings) or other non-uniform pedaling components (e.g. Rotor Cranks).

Consistent with some embodiments, readings from the accelerometers, alone or in combination with the applied force sensors in sensor device 302, may be analyzed using software to determine when cyclist 202 is standing. As cyclist 202 stands, loads increase markedly on both pedals momentarily as the cyclist's 202 full weight is born by pedals 204, and this increase in load will be reflected by an increase in the applied force measured by applied force sensors. As cyclist 202 pedals while standing, pedaling generally becomes less uniform and more rhythmical as cyclist 202 shifts his or her weight from side to side. The readings from the accelerometers, which measure acceleration across the bicycle (in the tipping left or right direction), will no longer be small and gentle but will gyrate as the cycle sways beneath the standing cyclist 202. Software, executed by a processor either in sensor device 302 or electronics module 304, can quantify the irregularities in pedaling and the consequent losses of efficiency allowing the cyclist 202 to train to overcome and improve technique while standing, especially as it relates to climbing.

Figure 4:
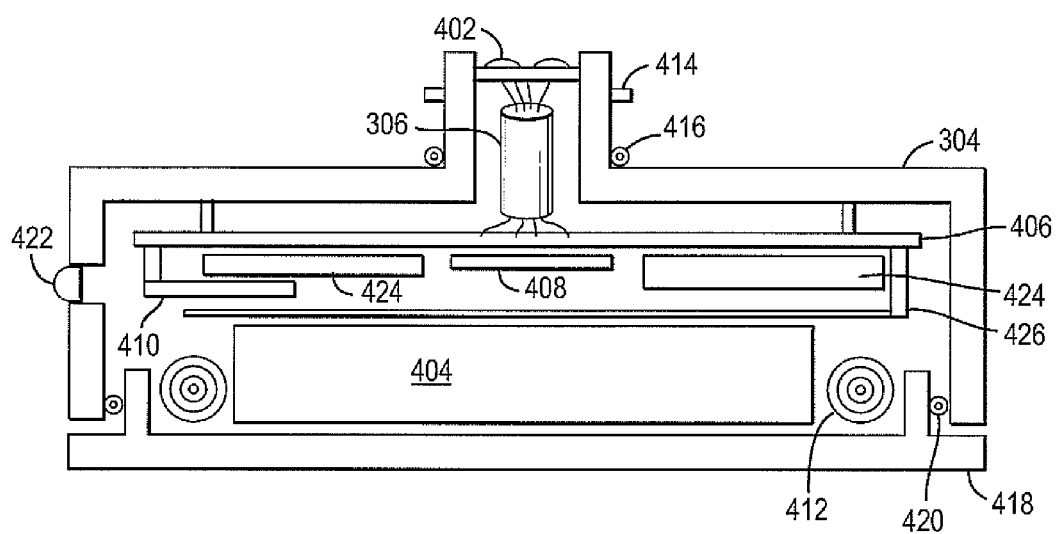
FIG. 4 is a diagram illustrating a electronics module as shown in FIG. 3.

FIG. 4 is a diagram illustrating electronics module 304 shown in FIG. 3. As shown in FIG. 4, electronics module 304 includes electrical contacts 402 which are coupled to wiring 306. In operation, electrical contacts 402 may be used to transmit power to sensor device 302 from power cell 404. In addition, wiring 306 also transmits signals from sensor device 302 to circuit board 406. Processor 408 receives the transmitted signals from the circuit board 406, and executes instructions stored in an onboard memory to process the received signals. Electronics module 304 may also include a digital signal processor (DSP) for removing noise in the signals received from sensor device 302. Consistent with some embodiments, the processing of the received signals may include storing the signals in the onboard memory, converting the signals to drive an audio or video output, and transmitting the signals to a data-logging and/or display unit. In accordance with some embodiments, the transmission of the signals to data logging and/or display unit may be performed via a wired connection or a wireless connection. The wireless connection may be performed using any of a radio frequency (RF), infrared, Bluetooth™, or any combination thereof.

As shown FIG. 4, reed switch 410 or induction coil 412 is coupled to circuit board 406 and detects the passing of magnet 308, shown in FIG. 3, once per revolution of the pedal. Electronics module 304 may be secured to pedal spindle 208 using a mount 414, such as a bayonet mount, and an external sealing mechanism 416, such as an O-ring, may be used to seal electronics module 304 and provide protection for the electronics in electronics module 304 from the environment. Electronics module 304 includes a removable cover 418 to allowing access to the components for servicing. Internal sealing mechanism 420 assists in the sealing of removable cover 418, and also provides protection from the environment. Electronics module 304 may also include a power indicator 422, which may be a light emitting diode (LED) powered by power cell 404.

As noted above, according to some embodiments, electronics module 304 may communicate wirelessly with, for example, a display. In such embodiments, a wireless transmitter 424 having an antenna 426 may be coupled to circuit board 406. Although some embodiments utilize electronics module 304 to house electronic components such as electrical contacts 402, power cell 404, circuit board 406, processor 408, and reed switch 410 or coil 412, other embodiments may utilize a circuit board which is part of the sensor device, wherein all of these electronic components are affixed to a flexible circuit board along with the applied force sensors, and mounted in pedal spindle 208. Examples of such embodiments are shown in, for example, FIGS. 7 and 8.

Figure 5A:
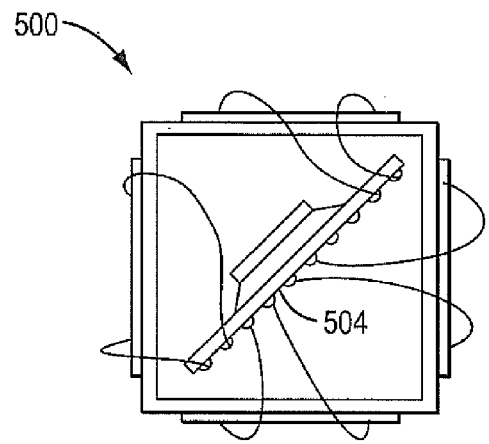
FIGS. 5A and 5B are diagrams illustrating a sensor device or system in accordance with some embodiments.
Figure 5B:
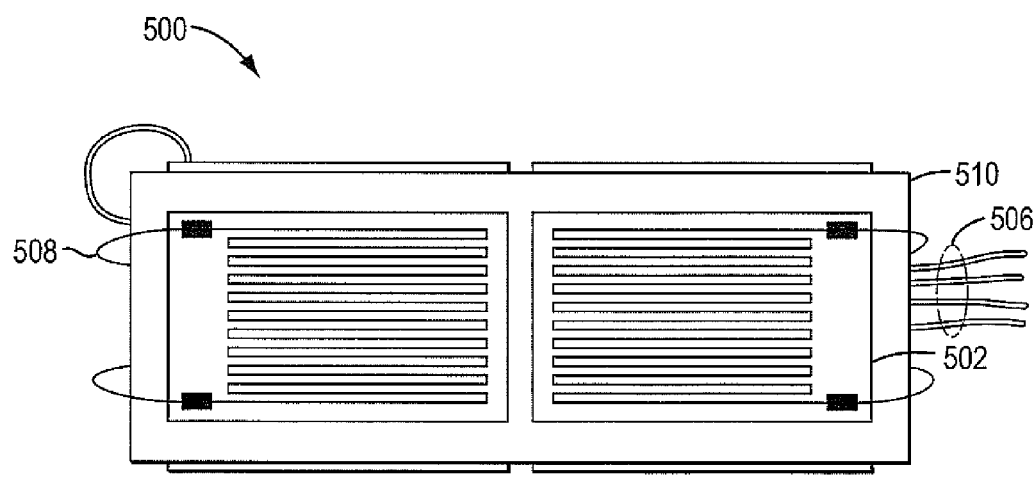

In accordance with some embodiments, commercially available strain gauges and microchips may be assembled into a sensor device and mounted in pedal spindle 208 to measure forces applied to a pedal. FIGS. 5A and 5B are diagrams illustrating a sensor device 500 in accordance with some embodiments. As shown in FIGS. 5A and 5B, sensor device 500 includes strain gauges 502 coupled to a circuit board 504. In accordance with some embodiments, strain gauges 502 may be replaced with piezoresistors or optical sensing means. Sensor device 500 further includes wiring 506 which extends from sensor device 500 and may be coupled to, for example, an electronics module, such as electronics module 304, or to a data logging and/or display device. Consistent with some embodiments, sensor device 500 may also be coupled to a data logging and/or display device via a wireless connection, such as RF, infrared, or Bluetooth™, provided by wireless transmitters provided on circuit board 504 or housed in electronics module 304. Additional wiring 508 couples strain gauges 502 to circuit board 504, for transmitting measurement results to components which may be on circuit board 504. Such components may include a processor, a storage device, a power source, one or more accelerometers, and one or more amplifiers.

Consistent with some embodiments, sensor device 500 may further include a resilient member 510, such as a spring, which is coupled to circuit board 504. Circuit board 504, strain gauges 502, and resilient member 510 may be placed within a pedal spindle, as shown in FIG. 5A, and may further be encapsulated using a resin or epoxy. Consistent with some embodiments, strain gauges 502 may measure an elastic deformation of resilient member 510, as it bends along with the pedal spindle as a cyclist applies force to a pedal. The measured elastic deformation may then be used to determine the applied forces using known methods, such as the methods used in the Reiser system discussed above if the pedal spindle has a linear response to applied forces. However, if the pedal spindle has a non-linear response to applied forces, the applied forces may be determined using look-up tables and interpolation populated through calibration and testing, as described above.

Figure 6:
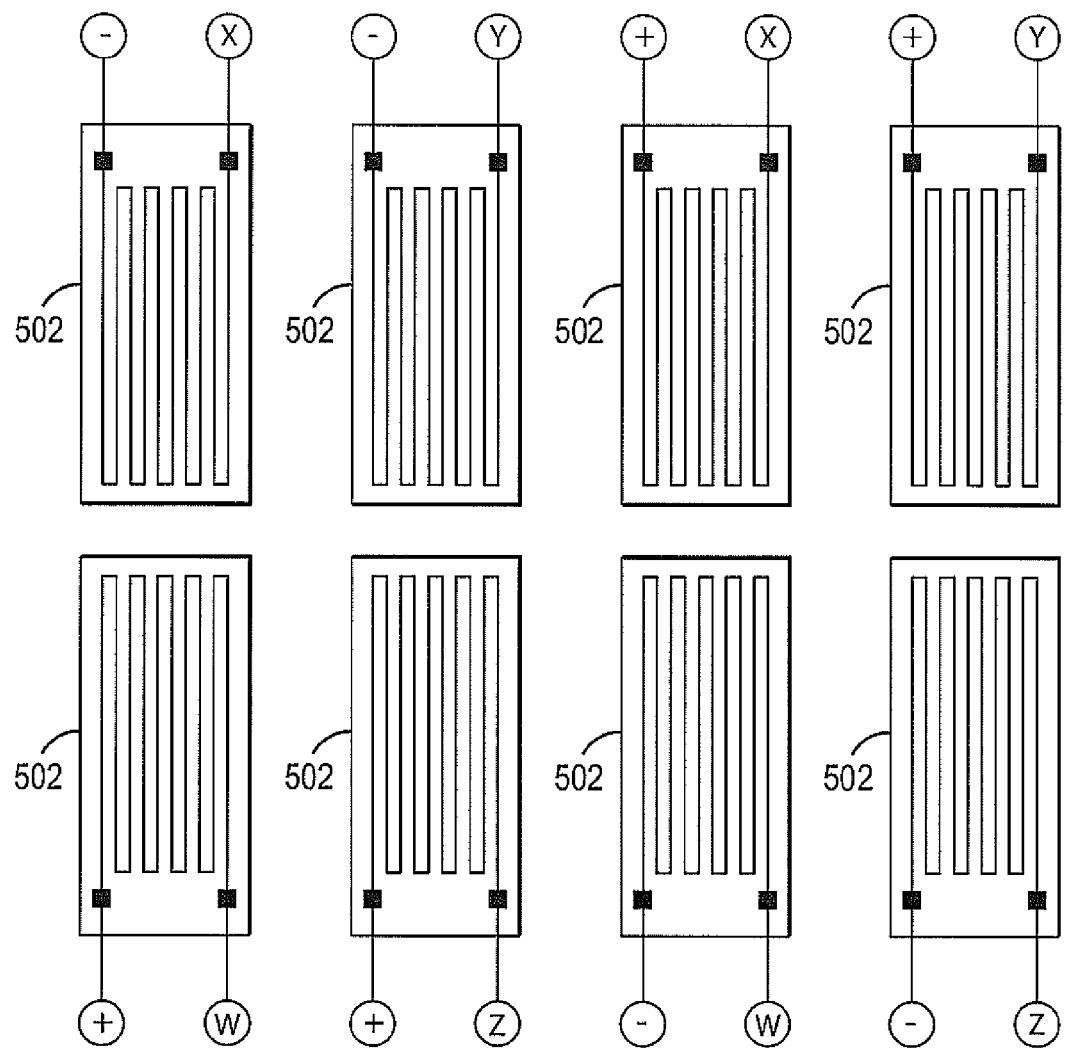
FIG. 6 is a diagram illustrating the electrical connection of the strain gauges illustrated in FIGS. 5A and 5B.

FIG. 6 is a diagram illustrating the electrical connection of strain gauges 502. Strain gauges 502 receive an excitation voltage from power source, which may include a power source embedded on circuit board 504, or a power source such as power cell 404 in electronics module 304, as shown in FIG.

4. As shown in FIG. 6, strain gauges 502 output two electrical voltages, each proportional to a deflection of a pedal spindle in one of the x, y, and z axes. As a cyclist pedals, crank arms of the cycle are deflected by the force applied by the cyclist. The applied force also deflects or deforms the pedal spindle, the deflection or deformation may then be detected by strain gauges 502 to provide a measurement of the applied force. Strain gauges 502 measure the elastic deformation of the pedal spindle by changing resistance. The change in resistance results in a change in voltage across the bridge outputs at terminal pairs w-x and y-z. Signals representative of the resulting changes in output may then be transferred to a processor, which may be on circuit board 504, or in electronics module 304, and processed. The signals output from strain gauges 502 may further be amplified by one or more amplifiers on circuit board 504 or in electronics module 304, or may be converted to a digital or analog signal using an analog-to-digital converter (ADC) or a digital-to-analog converter (DAC), respectively. The signals may also be transmitted to a data logging device, a storage device, or to a display, consistent with some embodiments. Although strain gauges 502 are shown and discussed in FIG. 6, some embodiments may use piezoelectric resistors or optical sensors to measure a deformation of the pedal spindle. Such embodiments operate in a substantially similar manner to the embodiments using strain gauges 502.

Figure 7:
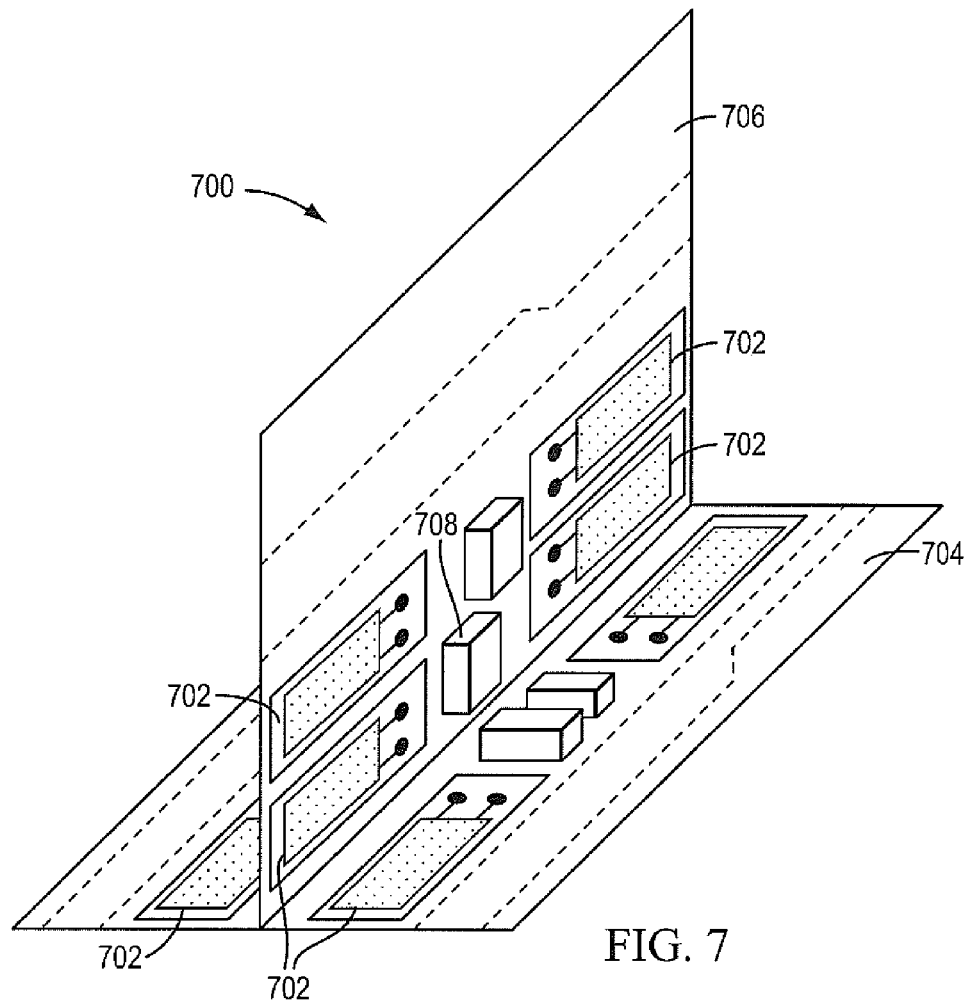
FIG. 7 is a diagram illustrating a sensor device or system consistent with some embodiments.

FIG. 7 is a diagram illustrating a sensor device 700 consistent with some embodiments. As shown in FIG. 7, sensor device 700 includes a plurality of sensors 702 mounted on a first substrate or circuit board 704 and a second substrate or circuit board 706, both of which are coupled together at a predetermined angle. According to some embodiments, sensors 702 may comprise strain gauges, piezoresistors, or other electrical or optical sensing means. Moreover, as shown in FIG. 7, first substrate or circuit board 704 can be coupled to second substrate or circuit board 706 at a ninety degree (90°) angle. First substrate or circuit board 704 and second substrate or circuit board 706 may further include a plurality of electronic components 708. Electronic components 708 may include one or more amplifiers, one or more processors, a storage device, wireless transmitters, one or more accelerometers, and a power source. In some embodiments, sensor device 700 may be mounted or encapsulated within a pedal spindle using epoxy or resin, as described above, and calibrated as described above. Moreover, first substrate or circuit board 704 and second substrate or circuit board 706 may be marked or perforated such that they can be trimmed to different sizes and shaped easily and quickly to facilitate mounting in different models of pedal spindles.

Figure 8:
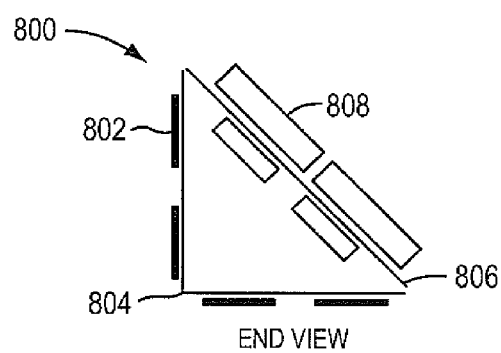
FIG. 8 is a diagram illustrating a sensor device or system consistent with some embodiments.

FIG. 8 is a diagram illustrating a sensor device 800 according to some embodiments. As shown in FIG. 8, sensor device 800 includes sensors 802 mounted on a substrate 804, such as plastic or metal, and then bending the substrate to 90 degrees (or thereabouts) and then attaching a circuit board 806 across the long sides of substrate 804. The angle of substrate 804 can then be fixed so that calibrations performed on sensor 800 will be permanent. Consistent with some embodiments, sensors 802 may include strain gauges, piezoresistors, or other electric or optical sensing means. Circuit board 806 may have electronic components 808 mounted thereon. Electronic components 808 may include one or more amplifiers, one or more processors, one or more accelerometers, a storage device, wireless transmitters, and a power source. In some embodiments, sensor device 800 may be mounted or encapsulated within a pedal spindle using epoxy or resin, as described above, and may be calibrated as described above. Moreover, substrate 804 and circuit board 806 may be marked or perforated such that they can be trimmed to different sizes and shaped easily and quickly to facilitate mounting in different models of pedal spindles.

Figure 9A:
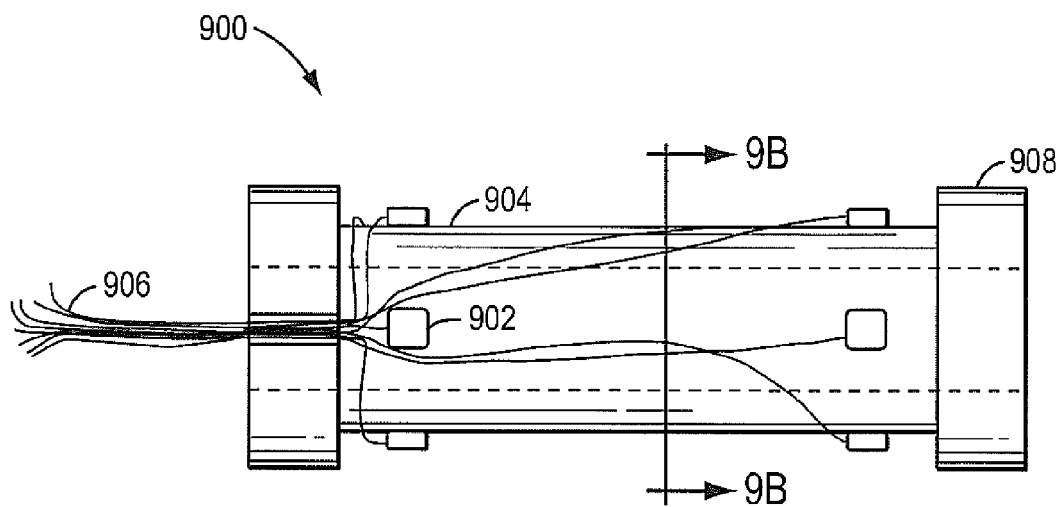
FIGS. 9A and 9B are diagrams illustrating is a sensor device according to some embodiments.
Figure 9B:
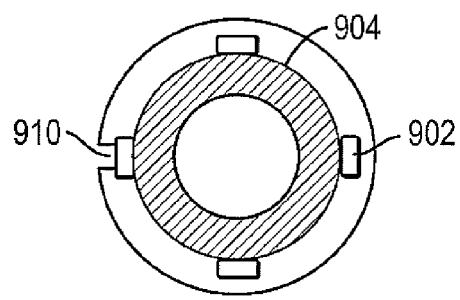

FIG. 9A is a diagram illustrating is a sensor device according to some embodiments. FIG. 9B is a diagram illustrating a cross-section of sensor device 900 along the line A-A. As shown in FIGS. 9A and 9B, sensor device 900 includes a plurality of sensors 902 mounted on a substrate 904. Consistent with some embodiments, substrate 904 may be a metallic substrate which is formed into a cylindrical or other three-dimensional geometric shape. Substrate 904 may further include a circuit board having traces formed thereon, wherein the circuit board is wrapped around the substrate, and sensors 902 are coupled together through the traces of the circuit board. Sensors 902 are coupled to an electronics module via wiring 906. The electronics module may be, for example, electronics module 304, as described above, and may be pedal-mounted module or a crank-mounted module. For example, an electronics module may include a circuit board coupled to sensors 902 via wiring 906, wherein the circuit board includes electronic components mounted thereon. The electronic components may include one or more processors, one or more accelerometers, a storage device, wireless transmitters, and a power source. The electronics module may also include substantially all of the components contained in electronics module 304, as shown in FIG. 4. Consistent with some embodiments sensor device 900 may be mounted in a pedal spindle using an adhesive at ends 908. As shown in FIG. 9B, sensor device 900 may also include an alignment mark 910 for use in properly aligning sensor device 900 when installing, as discussed above.

Consistent with some embodiments, sensors 902 may include strain gauges, piezoelectrics or piezoresistors, or optical sensing means. For example, sensors 902 may be piezoelectric resistors coupled in a bridge arrangement. In some embodiments, sensor 902 may be a bridge arrangement of four individual piezoelectric resistors. The individual piezoelectric resistors may be coupled together to form the bridge arrangement through the traces formed on a circuit board, as described above. Accordingly, as shown in FIG. 9A, sensor device 900 may include eight bridge arrangements 902 of four sensors each, for a total of 32 piezoelectric resistors.

In operation, sensors 902 sense changes in resistance indicative of changes in the deformation of a pedal spindle. These changes produce signals which are transmitted along wiring 906 to an electronic module, such as electronics module 304. The signals are stored in a storage device in the electronics module, and/or are processed by a processor in the electronics module. Consistent with some embodiments, the processor may execute instructions stored in a storage device of the electronics module to analyze the received signals using look-up tables and interpolation to provide an accurate measurement of the forces being applied on a pedal by a cyclist. The processor may further execute instructions stored in a storage device in the electronics module to analyze the received signals using look-up tables and interpolation to correct the signals for sensor drift.

In accordance with some embodiments, a sensor device, such as described in various embodiments throughout, may measure forces applied to pedals by a cyclist and/or compare the cyclist's efforts to an idealized path, which may render the cyclist's technique observable to the cyclist using visual or audio feedback. In accordance with some embodiments, a sensor device, such as described in various embodiments throughout, may allow a cyclist to observe and/or compare actual, directly observed (as opposed to calculated mathematically from a set of measurements on a sensor measuring the combined torque output of both legs) energy expended by each leg individually so that the cyclist can train to equalize the muscles in both legs. In accordance with some embodiments, a sensor device, such as described in various embodiments throughout, may provide substantially real-time feedback to monitor, enforce, or encourage correct behavior/technique. Moreover, a sensor device, such as described in various embodiments throughout, may allow transmission of substantially real-time data to a coach and/or trainer for assistance with training. Furthermore, a sensor device, such as described in various embodiments throughout, may transmit data to remote processing and displays (e.g. large monitors at velodromes).

Figure 10:
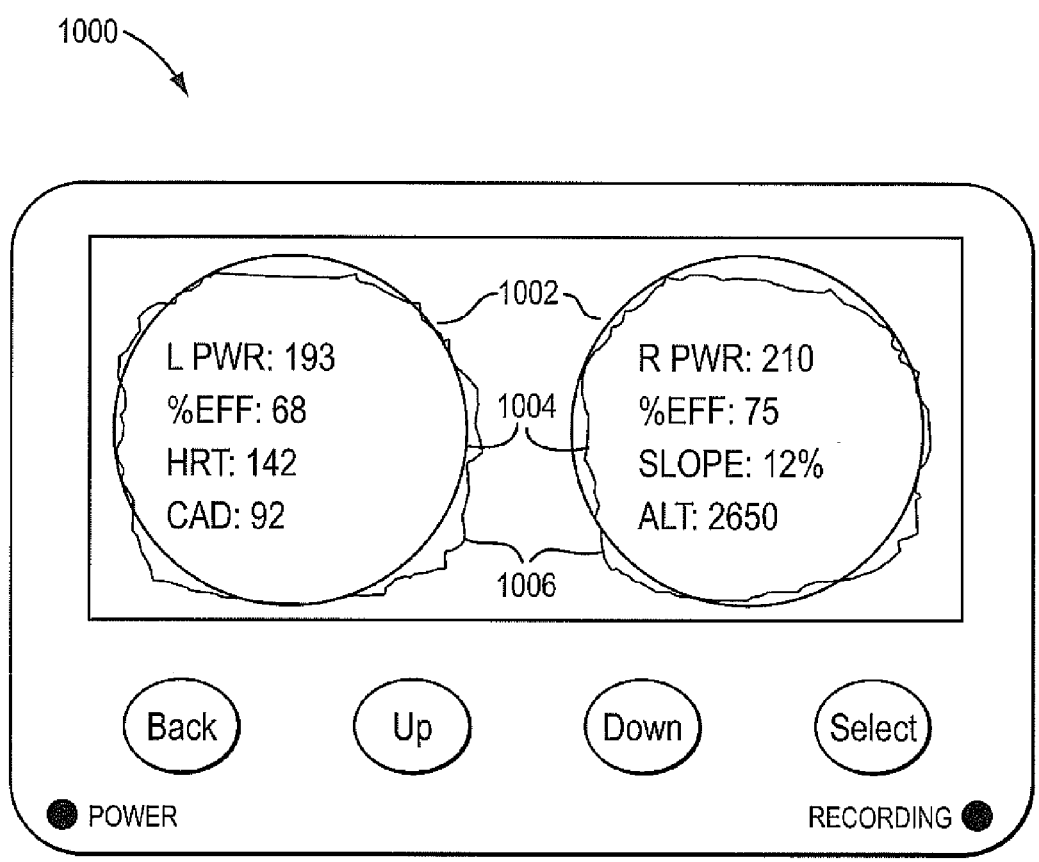
FIG. 10 is an example of a display unit according to some embodiments.

FIG. 10 is an example of a display unit 1000 according to some embodiments. As shown in FIG. 10, display unit 1000 may include a variety of display modes and a variety of display fields to suit a cyclist's preferences. Consistent with some embodiments, display unit may be mounted on a handlebar of a bicycle, allowing for convenient viewing by a cyclist. In other embodiments, display unit 1000 may be provided elsewhere on the bicycle, or on the cyclist. In still further embodiments, a second display unit having the same display features as display unit 1000 may be provided at a location remote to the cyclist, allowing a coach or trainer to review the information displayed thereon, and provide feedback to the cyclist. One of ordinary skill in the art will appreciate other display fields and other locations of the display aside from the handlebar, without departing from the disclosed embodiments. For example, measurements taken by the sensor devices and systems disclosed herein may be stored for later analysis by, or wirelessly transmitted to a personal digital assistant, mobile telephone, or a personal computer, wherein software executing on these devices provide a visual indication similar to display unit 1000.

Returning to FIG. 10, display unit 1000 includes polar diagrams 1002 for displaying forces applied by the cyclist. Polar diagrams 1002 include separate displays of forces applied by a cyclist's right and left legs. In addition, polar diagrams may further utilize different colors or shadings for each leg, and different colors to show an ideal pedal arc 904, and the cyclist's current pedal arc 1006, which shows unevenness due to wasted forces. An ideal pedaling motion will result in the cyclist's current pedal arc 1006 aligning with the ideal pedal arc 1004. Accordingly, a cyclist can view their current pedal arc 1006 and attempt to correct their cycling cadence or technique in order to fix any irregularities noted in the current pedal arc 1006 due to wasted forces. As shown in FIG. 9, when the cyclist's current pedal arc 1006 is inside the ideal pedal arc 1004, waste force is being applied in a direction that attempts to shorten the crank arm, and when the cyclist's current pedal arc 1006 is outside the ideal pedal arc 1004, waste force is being applied to attempt to stretch or lengthen the crank arm. The measurements provided by a sensor device or system according to the disclosed embodiments may provide information to display device 1000 such that display device 1000 is able to display current pedal arc 1006 as gross applied forces relative to ideal pedal arc 1004, or forces net of those caused by gravity and the cyclist's leg mass.

As shown in FIG. 10, display device may further display an applied power (PWR) provided by each leg of the cyclist, and an efficiency (% EFF), which is a ratio of crank propulsion force, or driving force, ($V_{power}$ as shown in FIG. 2) to applied force $V_{applied}$. Displaying of the efficiency and the applied power may enable the cyclist to train to maximize efficiency for example, by working to maximize the ratio of driving force to applied force. Consistent with some embodiments, display device 1000 may also provide a visual display of a force diagram, such as shown in FIG. 2.

As further shown in FIG. 10, a sensor device or system according to the disclosed embodiments may include a sensor for measuring a cyclists heart rate, such that the heart rate (HRT) can be displayed on display device. A cyclist may use information concerning the displayed heart rate to assist in training to a heart rate profile while increasing pedaling accuracy using the device. Some embodiments may show heart rate numerically, as in FIG. 10, however, other embodiments may show heart rate graphically, or by some other metric which may include averaging or comparing heart rate to pedaling efficiency or other metrics, allowing the cyclist to discover their peak performance zone.

As also shown in FIG. 10, a sensor device or system may also include a sensor, such as an accelerometer, or reed switch, coil or other magnetometer for detecting a magnet attached to a chain stay (for example, as shown in FIG. 3), such that information regarding cadence (CAD) may be determined. Some embodiments, for example as shown in FIG. 10, display cadence numerically, but other embodiments may display cadence graphically, or in relation to pedaling force components. Some embodiments may enable a cyclist to train to improve cadence while maintaining efficiency. Some embodiments may display averaged cadence or may display cadence graphically over a period of time in relation to waste force so that a cyclist or cycling coach may determine optimal pedaling technique.

As further shown in FIG. 10, a sensor device or system may also include a sensor, such as an accelerometer, a magnetometer, or an inclinometer for detecting a slope or incline of the cyclist, and displaying this measurement to the cyclist. The display of a grade or slope or incline of surface being cycled upon may enable a cyclist to observe changes in efficiency of pedaling technique in relation to slope or incline or grade. As shown in FIG. 9, some embodiments may display slope or grade or incline as a percentage grade, however, other embodiments may display slope or incline or grade numerically in various units, such as component of gravity accelerating cycle, angle of slope or other numeric or graphical means. Moreover, consistent with some embodiments, display device 900 could display a graph of time, distance, slope, speed, or force components to facilitate observation or training or other goals.

Consistent with some embodiments, display device 1000 may enable entry and display of a training profile to allow training to a time and power profile while monitoring for proper pedaling technique. For example, a cyclist or coach/trainer may populate the cells of a matrix to control the graphic display. The first row of cells could hold time values; the next row, desired power output; the third row, a tolerance for error in technique; a fourth row, the tolerance for difference in power output for each leg; and so on. Consistent with some embodiments, the rows of cells could be reconfigured to address a cyclist's particular training needs or goals, such that any parameter measured by a sensor device or system according to the disclosed embodiments could be displayed on display device 1000. The training profile and progress feedback may be displayed in simple numeric mode, for example as target leg force versus current leg force or differences. Alternatively, feedback may be displayed graphically portraying the profile of the workout versus the time a given cyclist rides the profile. The whole workout may be displayed with time on the x-axis and the various entered parameters on the y-axis (with appropriate scales) and a line of progress may be superimposed on the profiles of the workout as entered and displayed. A line or shape moving across the display may track time or the display may scroll beneath the indicator line or shape with a user selected history period and user selected look-ahead. Different training profiles may allow the cyclist to experiment with recruitment of different muscle sets to determine optimal muscle use under different circumstances, such as climbing or sprinting, which would be visible to the cyclist on display unit 1000. Observations may also reveal to the cyclist that shifting use of various muscle groups will allow the cyclist to increase endurance by intermittently resting alternate muscle groups.

In addition to the visual feedback provided by display device 1000, some embodiments may utilize audio feedback. Wireless radio frequency (RF), infrared or Bluetooth™ headsets, or buzzers, may provide near real-time information about pedaling technique or other measured entities to the cyclist or other party. Buzzers may be incorporated in the sensor device or electronics module, or as a separate add on to be attached where desired, and may change sound characteristics to provide information to the user. For example, the buzzers or headsets may generate sound proportional to the magnitude of wasted forces, alerting the cyclist to suboptimal pedaling technique. Buzzers and headsets may be programmed to change sound characteristics with desired pedaling characteristics; for example, a cyclist may wish to be alerted only when pedaling in such a way as wasting more than a predetermined amount of force, and then to hear a signal that becomes louder as the threshold is exceeded by greater amounts. In accordance with some embodiments, left and right transducers may produce sound at different frequencies or patterns, as desired by the end user, without departing from the embodiments. Stereo headsets may provide independent left and right channels for feedback, while monaural devices use different frequencies for left and right channels.

Embodiments as disclosed herein may provide a cyclist with near-real-time analysis of the forces being applied by each leg on a pedal of a bicycle. Using this analysis, a cyclist may be able to correct their pedaling technique, such that they are pedaling in a circle, and minimizing or eliminating wasted forces. Once the cyclist has learned to pedal in a circle, the cyclist may then increase cadence while ensuring that the proper pedaling technique is not lost in the quest for speed. A resulting pedaling style may be relatively efficient and may increase competitiveness of the cyclist for a given expenditure of effort.

In the preceding specification, the disclosure has been described with reference to specific exemplary embodiments. It will however, be evident that various modifications and changes may be made without departing from the broader spirit and scope of the disclosure as set forth in the claims that follow. The specification and drawings are accordingly to be regarded as illustrative rather than restrictive sense. Other embodiments of the disclosure may be apparent to those skilled in the art from consideration of the specification and practice of the invention disclosed herein.

What is claimed is:

1. A sensor device for determining forces exerted by a cyclist on a pedal of a bicycle, comprising:
    a plurality of sensors coupled to a substrate; and
    wiring coupled to the sensors and the substrate,
    wherein the sensors, the substrate, and the wiring are housed inside a pedal spindle coupled to the pedal,
    wherein the pedal spindle includes a first pedal spindle for a left pedal and a second pedal spindle for a right pedal, wherein the sensors in the left pedal spindle measure deformations generated by a left leg of a cyclist on the left pedal, and the sensors in the second pedal spindle measures deformation generated by a right leg of the cyclist on the right pedal.

2. The sensor device of claim 1, wherein the sensors, the substrate, and at least a portion of the wiring are encapsulated in an epoxy or a resin.

3. The sensor device of claim 1, wherein the wiring is coupled to an electronics module.

4. The sensor device of claim 1, wherein the electronics module is mounted on one of the pedal or a crank of the bicycle, or is mounted in the pedal spindle.

5. The sensor device of claim 3, wherein the electronics module comprises: a wireless transmitter for wirelessly transmitting data to an external receiver having a display; a processor; a storage device; and a power source.

6. The sensor device of claim 5, wherein measurements from the sensors are stored in the storage device and analyzed using instructions stored in the storage device executed by the processor.

7. The sensor device of claim 6, wherein the instructions perform at least one of a real-time analysis and an analysis over time of the determined forces.

8. The sensor device of claim 5, wherein the wireless transmitter comprises one of a radio frequency (RF) transmitter, an infrared transmitter, and a Bluetooth.TM. transmitter.

9. A sensor device for determining forces exerted by a cyclist on a pedal of a bicycle, comprising:
    a plurality of sensors coupled to a substrate; and
    wiring coupled to the sensors and the substrate,
    wherein the sensors, the substrate, and the wiring are housed inside a pedal spindle coupled to the pedal,
    wherein the electronics module comprises: a wireless transmitter for wirelessly transmitting data to an external receiver having a display; a processor; a storage device; and a power source,
    wherein the power source comprises an inductor coil coupled to a power cell, the inductor coil generating an electrical charge that is stored by the power cell when a magnet mounted on a chain passes by the inductor coil.

10. A sensor device for determining forces exerted by a cyclist on a pedal of a bicycle, comprising:
    a plurality of sensors coupled to a substrate; and
    wiring coupled to the sensors and the substrate,
    wherein the sensors, the substrate, and the wiring are housed inside a pedal spindle coupled to the pedal,
    wherein the electronics module comprises: a wireless transmitter for wirelessly transmitting data to an external receiver having a display; a processor; a storage device; and a power source,
    wherein the power source comprises solar cells mounted on a bottom surface of the pedal and coupled to a power cell.

11. The sensor device of claim 5, wherein the power source comprises dry cells or batteries mounted in the electronics module and coupled to the pedal spindle by induction rings.

12. The sensor device of claim 5, wherein the power source comprises piezoelectric elements.

13. The sensor device of claim 5, wherein the display provides a visual indication of the determined forces, including where force is being wasted, and where energy can be saved without affecting a driving force or speed.

14. The sensor device of claim 5, wherein the pedal spindle is capable of being interchangeable with a stock pedal spindle.

15. The sensor device of claim 1, wherein the sensors comprise at least one of strain gauges, piezoelectric resistors, magnetic sensors, and optical sensors.

16. The sensor device of claim 15, wherein the sensors comprise at least one of strain gauges and piezoelectric resistors, the strain gauges and/or piezoelectric resistors being configured in a Wheatstone bridge arrangement, and determine the applied forces by measuring a deformation between the pedal and a crank.

17. The sensor device of claim 1, wherein the determined forces are used to determine a pedaling efficiency, which is defined as a ratio of driving force over total applied force.

18. The sensor device of claim 1, further comprising: at least one accelerometer coupled to the substrate, the at least one accelerometer measuring an acceleration of the device in at least one axis, the measured acceleration being used to determine a uniformity of a cyclist's cadence.

19. The sensor device of claim 1, further comprising: at least one magnetometer coupled to the pedal, the magnetometer detecting an angle of the pedal.

20. A sensor device for determining forces exerted by a cyclist on a pedal of a bicycle, comprising:
a plurality of sensors coupled to a substrate; and
wiring coupled to the sensors and the substrate,
wherein the sensors, the substrate, and the wiring are housed inside a pedal spindle coupled to the pedal,
wherein the sensor device further comprises at least one magnetometer coupled to the pedal, the magnetometer detecting an angle of the pedal, wherein the detected angle of the pedal is used to determine at least one of muscle firing timing of a cyclist, physical characteristics of the cyclist, and a cadence of the cyclist.

21. The sensor device of claim 1, wherein the substrate comprises at least one printed circuit board.

22. A sensor device for determining forces exerted by a cyclist on a pedal of a bicycle, comprising:
a plurality of sensors coupled to a substrate; and
wiring coupled to the sensors and the substrate,
wherein the sensors, the substrate, and the wiring are housed inside a pedal spindle coupled to the pedal,
wherein the substrate comprises at least one printed circuit board,
wherein the at least one printed circuit board comprises a first printed circuit board substantially perpendicularly coupled to a second circuit board,
wherein four sensors are mounted on the first circuit board, and four sensors are mounted on the second circuit board.

23. A sensor device for determining forces exerted by a cyclist on a pedal of a bicycle, comprising:
a plurality of sensors coupled to a substrate; and
wiring coupled to the sensors and the substrate,
wherein the sensors, the substrate, and the wiring are housed inside a pedal spindle coupled to the pedal,
wherein:
the substrate is bent at an angle of about 90 degrees to form a first section that is substantially perpendicular to a second section; and
a printed circuit board is coupled to an end of the first section and an end of the second section.

24. The sensor device of claim 1, wherein the substrate comprises a printed circuit board having electrical components connected thereto, wherein the electrical components comprise :a wireless transmitter for wirelessly transmitting data to an external receiver having a display; a processor; a storage device; and a power source.

25. The sensor device of claim 1, wherein the substrate is mounted in the pedal spindle using an adhesive.

26. A sensor device for determining forces exerted by a cyclist on a pedal of a bicycle, comprising:
a plurality of sensors coupled to a substrate; and
wiring coupled to the sensors and the substrate,
wherein the sensors, the substrate, and the wiring are housed inside a pedal spindle coupled to the pedal,
wherein the substrate is mounted in the pedal spindle using an adhesive,
wherein the sensors comprise a plurality of piezoelectric resistors coupled together to form a plurality of bridge arrangements, the bridge arrangements being mounted on a surface of the substrate.

27. A system for improving a pedaling technique of a cyclist, comprising:
a sensor provided in a pedal spindle of a pedal, the sensor determining forces exerted by the cyclist on the pedal;
a storage medium and a processor coupled to the sensor, the processor executing instructions stored in the storage medium for analyzing the determined forces to provide information related to the pedaling of the cyclist, wherein the determined forces are used to determine optimal shifting points for shifting gears; and
a display coupled to the sensor, the display providing the information in real time to the cyclist.

28. The system of claim 27, further comprising at least one accelerometer coupled to the pedal, wherein: the at least one accelerometer determines an acceleration of the pedal; and
the determined acceleration and the determined forces are used to determine at least one of a cadence of the cyclist, a uniformity of the cadence, a uniformity of the cyclist's applied power, a slope or inclination of the cyclist, and whether the cyclist is standing.

* * * * *